United States Patent
Hwang et al.

(10) Patent No.: US 12,263,605 B2
(45) Date of Patent: Apr. 1, 2025

(54) COLLABORATIVE DUAL-ROBOT HINGE INSTALLATION SYSTEM INCLUDING A SINGLE MULTI-PURPOSE VISION SYSTEM

(71) Applicant: GM GLOBAL TECHNOLOGY OPERATIONS LLC, Detroit, MI (US)

(72) Inventors: Dooil Hwang, Rochester Hills, MI (US); Frederick G. Landry, Jr., Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 17/949,657

(22) Filed: Sep. 21, 2022

(65) Prior Publication Data

US 2024/0091947 A1    Mar. 21, 2024

(51) Int. Cl.
  *B25J 9/16*    (2006.01)
  *B62D 65/06*    (2006.01)

(52) U.S. Cl.
  CPC .......... *B25J 9/1697* (2013.01); *B25J 9/1664* (2013.01); *B25J 9/1682* (2013.01); *B62D 65/06* (2013.01)

(58) Field of Classification Search
  CPC ...... B25J 9/1697; B25J 9/1664; B25J 9/1682; B25J 9/1669; B25J 9/043; B25J 9/0084; B25J 9/0087; B25J 15/0052; B25J 15/0066; B25J 15/0061; B62D 65/06; B62D 65/028; G05B 2219/39117; G05B 2219/39109; G05B 2219/40307; G05B 2219/40238
  USPC ....................................................... 700/255
  See application file for complete search history.

(56) References Cited

U.S. PATENT DOCUMENTS

| 7,549,204 B1 * | 6/2009 | Vangal-Ramamurthy ................... B23P 19/066 29/407.04 |
| 2006/0107507 A1 | 5/2006 | Brose et al. |
| 2011/0022228 A1 | 1/2011 | Mikurube et al. |
| 2014/0165360 A1 * | 6/2014 | Mangiarino ........... B62D 65/06 29/407.1 |

(Continued)

FOREIGN PATENT DOCUMENTS

| DE | 102012112025 B4 | 5/2016 |
| DE | 102017007353 A1 | 2/2019 |

(Continued)

OTHER PUBLICATIONS

Office Action dated Nov. 3, 2023 from German Patent Office for German Patent No. 10 2023 111 251.1; 5 pages.

*Primary Examiner* — Adam R Mott
*Assistant Examiner* — Joseph Anthony Trias

(57) ABSTRACT

A collaborative dual robot hinge mounting system includes: a first robot including an end effector that moves a pair of bolts in position to be run through a pair of hinges and into a BIW, where the end effector includes a first bolt runner and a second bolt runner; and first and second cameras that detect locations or orientations of hinge mounting holes on the BIW for the pair of hinges. A control module sends to a second robot the locations or orientations of the hinge mounting holes to signal the second robot to position the pair of hinges relative to the BIW and, in response to detecting the pair of hinges being placed relative to the BIW, drives the pair of bolts via the first bolt runner and the second bolt runner through the pair of hinges and into the hinge mounting holes in the BIW.

18 Claims, 8 Drawing Sheets

(56) References Cited

U.S. PATENT DOCUMENTS

| | | | | |
|---|---|---|---|---|
| 2014/0165386 A1* | 6/2014 | Jin | ................ | B62D 65/024 |
| | | | | 29/700 |
| 2015/0013132 A1* | 1/2015 | Wang | ................ | B62D 65/00 |
| | | | | 29/281.5 |
| 2022/0410396 A1* | 12/2022 | Kim | ................ | B25J 9/1687 |

FOREIGN PATENT DOCUMENTS

| DE | 102020101927 B4 | 3/2022 |
|---|---|---|
| DE | 102013114877 B4 | 4/2022 |

\* cited by examiner

COLLABORATIVE DUAL-ROBOT HINGE INSTALLATION SYSTEM INCLUDING A SINGLE MULTI-PURPOSE VISION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to door hinge installation systems for vehicles.

A door of a vehicle typically includes two hinges; an upper hinge and a lower hinge. The hinges may be fastened to a body-in-white (BIW) of a vehicle and to the door. The hinge mounting locations on the BIW and/or the corresponding hole locations of the bolts used to fasten the hinges to the BIW can be different for different model vehicles. The hinge mounting locations on the BIW and/or the corresponding hole locations can also be different for different pillars (e.g., A and B pillars) of a vehicle. To account for these differences a different set of vision system cameras can be used to detect the hinge mounting locations and/or the corresponding hole locations. The sets of visions systems are in predetermined fixed locations relative to the BIW.

SUMMARY

A collaborative dual robot hinge mounting system is disclosed and includes: a first robot including a first end effector and configured to move a pair of bolts via the first end effector in position to be run through a pair of hinges and into a body-in-white (BIW), where the first end effector includes a first bolt runner and a second bolt runner; a first camera and a second camera configured to detect at least one of locations and orientations of hinge mounting holes on the BIW for the pair of hinges; and a control module. The control module is configured to i) send to a second robot the at least one of the locations and the orientations of the hinge mounting holes to signal the second robot to position the pair of hinges relative to the BIW, and ii) in response to detecting the pair of hinges being placed relative to the BIW, drive the pair of bolts via the first bolt runner and the second bolt runner through the pair of hinges and into the hinge mounting holes in the BIW.

In other features, the first end effector includes a linear actuator configured to move the first bolt runner relative to the second bolt runner.

In other features, the first camera and the second camera are mounted on the first end effector. The first end effector includes a linear actuator configured to move the first camera relative to the second camera.

In other features, the linear actuator is configured to move the first camera and the first bolt runner relative to the second camera and the second bolt runner.

In other features, the first camera and the second camera are configured to detect the locations and the orientations of the hinge mounting holes on the BIW for the pair of hinges. The control module is configured to send to the second robot the locations and the orientations of the hinge mounting holes.

In other features, the control module is configured to receive a signal from the second robot indicating that the pair of hinges have been placed relative to the BIW and are ready to be attached to the BIW.

In other features, the control module is configured to, via at least one of the first camera and the second camera, detect that the pair of hinges have been placed relative to the BIW and are ready to be attached to the BIW.

In other features, the collaborative dual robot hinge mounting system further includes the second robot including a second end effector, where the second robot via the second end effector is configured to position the pair of hinges relative to the BIW in response to a signal received from the first robot indicating the locations of the pair of hinges.

In other features, the control module is configured to verify torque applied by the first bolt runner and the second bolt runner respectively on the pair of bolts.

In other features, the control module is configured i) via the first camera and the second camera, to detect centers of the pairs of holes and the orientations of the pairs of holes relative to at least one of the BIW and the first robot, and ii) subsequent to the second robot positioning the pair of hinges relative to the BIW, to position the first bolt runner and the second bolt runner relative to the pair of hinges based on the centers of the pairs of holes and the orientations of the pairs of holes.

In other features, the first camera and the second camera are smart cameras configured to determine the locations and the orientations of the pair of holes, offset values for the pair of holes relative to reference values, and send the locations, the orientations and the offset values to the second robot.

In other features, a method of operating a collaborative dual robot hinge mounting system is disclosed. The method includes: moving a pair of bolts via a first end effector of a first robot in position to be run through a pair of hinges and into a body-in-white (BIW), where the first end effector includes a first bolt runner and a second bolt runner; detecting via a first camera and a second camera at least one of locations and orientations of hinge mounting holes on the BIW for the pair of hinges; sending to a second robot the at least one of the locations and the orientations of the hinge mounting holes to signal the second robot to position the pair of hinges relative to the BIW; and in response to detecting the pair of hinges being placed relative to the BIW, driving the pair of bolts via the first bolt runner and the second bolt runner through the pair of hinges and into the hinge mounting holes in the BIW.

In other features, the method further includes, prior to driving the pair of bolts via the first bolt runner and the second bolt runner through the pair of hinges and into the hinge mounting holes, moving the first bolt runner relative to the second bolt runner.

In other features, the method further includes, prior to driving the pair of bolts via the first bolt runner and the second bolt runner through the pair of hinges and into the hinge mounting holes, moving the first camera relative to the second camera.

In other features, the method further includes: detecting the locations and the orientations of the hinge mounting holes on the BIW for the pair of hinges; and sending from the first robot to the second robot the locations and the orientations of the hinge mounting holes.

In other features, the method further includes receiving a signal from the second robot indicating that the pair of hinges have been placed relative to the BIW and are ready to be attached to the BIW.

In other features, the method further includes, via at least one of the first camera and the second camera, detecting that the pair of hinges have been placed relative to the BIW and are ready to be attached to the BIW.

In other features, the method further includes positioning via the second robot the pair of hinges relative to the BIW in response to a signal received from the first robot indicating the locations of the pair of hinges.

In other features, the method further includes verifying torque applied by the first bolt runner and the second bolt runner respectively on the pair of bolts.

In other features, the method further includes i) via the first camera and the second camera, detecting centers of the pairs of holes and the orientations of the pairs of holes relative to at least one of the BIW and the first robot, and ii) subsequent to the second robot positioning the pair of hinges relative to the BIW, positioning the first bolt runner and the second bolt runner relative to the pair of hinges based on the centers of the pairs of holes and the orientations of the pairs of holes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
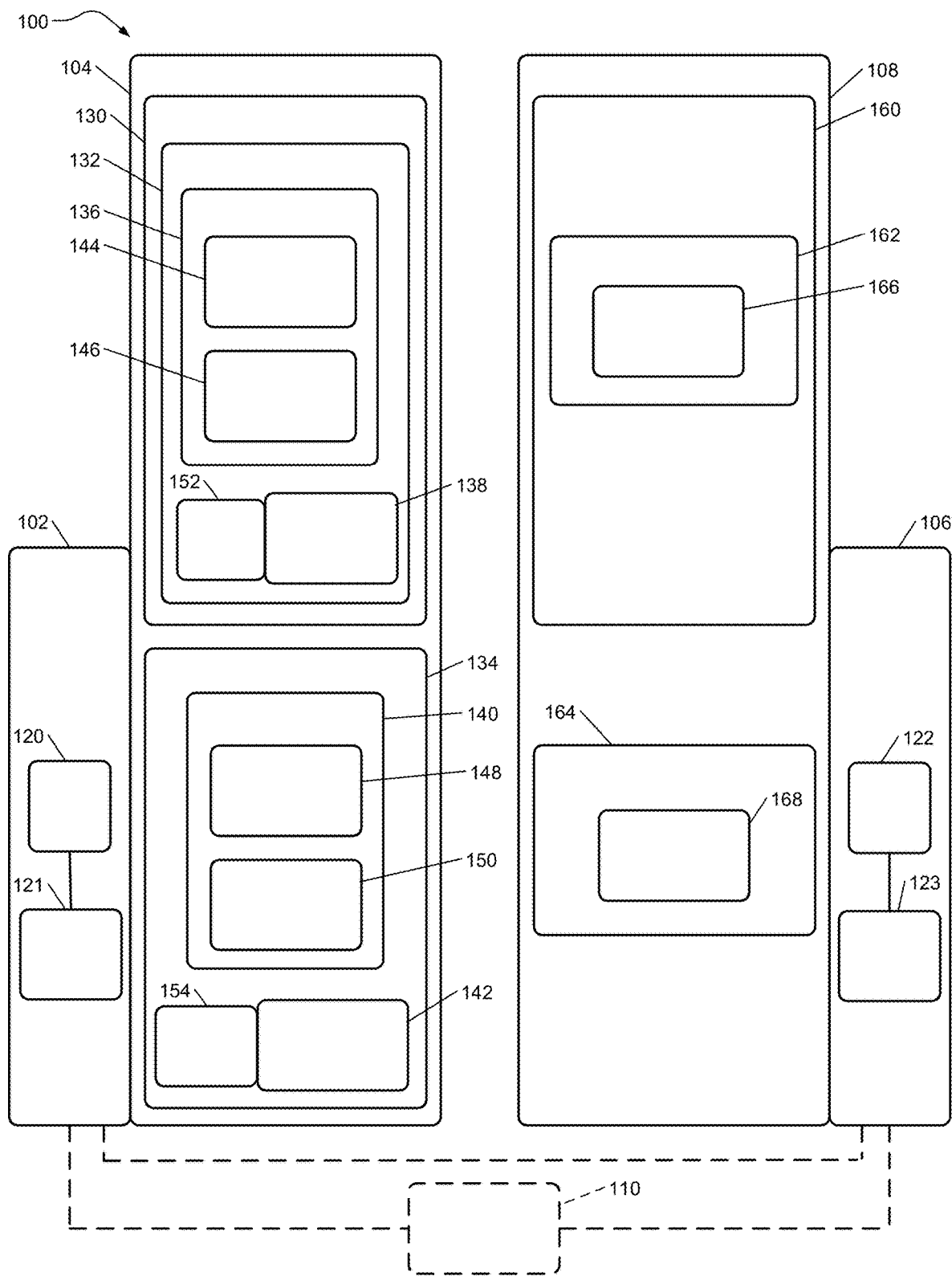
FIG. 1 a functional block diagram of an example collaborative dual robot hinge mounting system including a single multi-purpose vision system in accordance with the present disclosure.

Hinge mounting locations and orientations on a BIW and the corresponding hole locations and orientations of the bolts used to fasten the hinges to the BIW can be different for different model vehicles and for different pillars (e.g., A and B pillars) of a particular vehicle. The hole locations refer to holes in the BIW. The orientations of the holes may refer to orientations of longitudinal centerlines of the holes. The hinge mounting locations and orientations on the BIW and the corresponding hole locations and orientations can vary from BIW-to-BIW of the same vehicle model. One solution to account for these differences and variations is to use a different set of vision cameras for each pillar and for each vehicle model. The cameras may be located in predetermined fixed locations relative to a BIW. This however provides a vision system having numerous cameras, which increases costs and system complexity. In addition, because the cameras are in certain fixed locations, the positions of the cameras relative to the holes, the distances between the cameras and the holes, and the orientations of the cameras relative to the orientations of the holes may limit the ability of the vision system to provide accurate readings of hole locations and orientations.

The examples set forth herein include collaborative dual robot hinge mounting systems that each include a single multi-purpose vision system. Each of the multi-purpose vision systems includes a pair of cameras. As a result, a hinge mounting station in accordance with the present disclosure has a single pair of cameras for mounting upper and lower hinges of: pillars of a BIW; pillars of different BIWs of different vehicles of a same model; and for pillars of BIWs of different model vehicles. Each collaborative dual robot hinge mounting system includes a BRR having a pair of cameras and a HIR that does not include a camera. Real-time collaboration is provided between the BRR and the HIR. The BRR determines the locations and orientations of hinge mounting holes of a BIW based on captured images provided by the cameras and shares this information with the HIR. The HIR then positions hinges relative to the BIW. Bolt runners of an end effector of the BRR then drive bolts through the hinges and into the BIW.

The examples disclosed herein reduce the number of cameras and/or vision systems used to orient and mount hinges and position, orient and drive corresponding hinge mounting bolts. Each BRR and each HIR includes an end effector with 6 degrees of freedom of movement. Each BRR also includes a linear actuator for adjusting distances between cameras and blot runners. Each HIR also includes a linear actuator for adjusting distances between hinge clamps. The linear actuators provide flexibility in relative positioning between cameras, between bolt runners, and between hinge clamps. The vision system of each BRR is able to directly read the locations and orientations of door hinge mounting holes and provide appropriate offset values for the corresponding HIR. The offset values refer to differences between i) reference (or baseline) locations and orientations, and ii) detected actual locations and orientations. The end effectors of the BRRs and HIRs are able to moved and oriented for various different pillars and BIWs of the same or different vehicle models. The vision systems of the BRRs are able to be repositioned for the various different pillars and BIWs. Offset values may be provided for each repositioning of the vision systems and used by the HIRs.

The examples eliminate the need for vision systems that are specifically allocated for reading vehicle-specific hinge mounting positions and/or corresponding hinge mounting hole locations. The examples provide enhanced hinge positioning and bolt positioning integrity by more accurately detecting actual hinge mounting hole locations and orientations. The resultant examples have a reduced number of vision systems and/or cameras, reduced complexity and reduced associated cost than traditional approaches.

FIG. 1 shows a collaborative dual robot hinge mounting system 100 that includes a BRR 102, a BRR end effector (EE) (or first end effector) 104, a HIR 106, a HIR EE (or second end effector) 108, and may include a system control module 110. In one embodiment, the system control module 110 is not included and the BRR 102 directly communicates with the HIR 106. In another embodiment, the control module 110 transfers signals between the control modules 120, 122 and/or controls operations of the control modules 120, 122. In another embodiment, the control modules 120, 122 operate independent of the control module 110. The control module 110 may be located remotely from the robots 102, 106.

The BRR 102 includes a BRR control module 120 and a BRR memory 121. The HIR 106 includes a HIR control module 122 and a HIR memory 123. The robots 102, 106 are able to move the end effectors 104, 108 in X, Y, Z directions and rotate the end effectors 104, 108 about each of the X, Y and Z axes to provide 6 degrees of freedom of movement.

The first end effector 104 includes: a first linear actuator 130, which is connected to a first BRR EE bracket 132; and a second BRR EE bracket 134. The first linear actuator 130 is part of a first servo linear system that moves the first BRR EE bracket 132 relative to the second BRR EE bracket 134. The first servo linear system includes the BRR control module 120 and the first linear actuator 130. A first camera 136 and a first bolt runner 138 are attached to and move with the first BRR EE bracket 132. A second camera 140 and a second bolt runner 142 are attached to and move with the second BRR EE bracket 134.

The first camera 136 includes an image sensor (e.g., a charge-coupled device (CCD) or other image sensor) 144 and a control module 146. The second camera 140 includes an image sensor (e.g., a charge-coupled device (CCD) or other image sensor) 148 and a control module 150. The cameras 136, 140 and the control module 120 are implemented as a single multi-purpose vision system. In one embodiment, the cameras 136, 140 are configured to provide two-dimensional images. In another embodiment, the cameras 136, 140 are configured to provide three-dimensional images. The single multi-purpose vision system is integrated with the BRR EE 104. In one embodiment, the cameras 136, 140 are smart cameras including the control modules 146, 150, which are configured to determine locations and orientations of hinge mounting holes of a BIW, determine offset values as referred to herein, and provide the locations, orientations and offset values to the control module 122 of the HIR robot 106. This information may be sent directly to the control module 122 or sent via one or more of the control modules 120, 110. In an embodiment, the control modules 120, 146, 150 are implemented as a single control module, which may be incorporated in the robot 102, the end effector 104 or one of the cameras 136, 140.

A first current sensor 152 and a second current sensor 154 may be connected to the bolt runners 138, 142 and detect amount of current draw by the bolt runners 138, 142. The BRR control module 120 may adjust current to the bolt runners 138, 142 to adjust torque on mounting bolts based on the current levels drawn by the bolt runners 138, 142. The locations of the current sensors 152, 154 are provided as an example, the current sensors 152, 154 may be located elsewhere.

The second end effector 108 includes: a second linear actuator 160, which is connected to a first HIR EE bracket 162; and a second HIR EE bracket 164. The second linear actuator 160 is part of a second servo linear system that moves the first HIR EE bracket 162 relative to the second HIR EE bracket 164. The second servo linear system includes the HIR control module 122 and the second linear actuator 160. The first HIR EE bracket 162 is connected to a first clamp 166. The second HIR EE bracket 164 is connected to a second clamp 168. The first clamp 166 and the second clamp 168 may be pneumatic actuated to move corresponding grippers to grip hinges.

Figure 2:
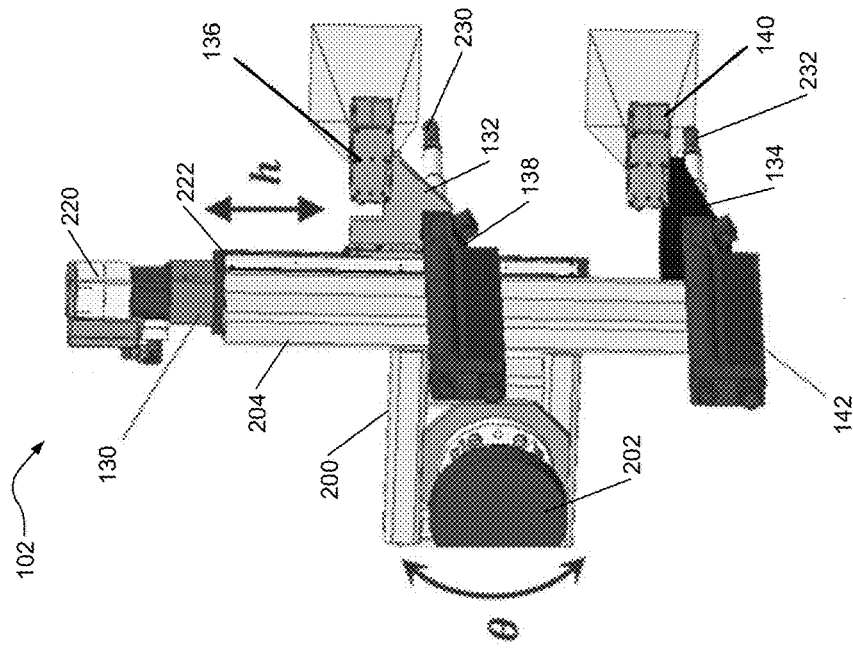
FIG. 2 is a side perspective view of an example bolt running robot (BRR) end effector including a linear actuator, dual cameras and dual bolt runners in accordance with the present disclosure.

FIG. 2 shows the BRR end effector 104 that includes a robot arm attachment assembly 200, which includes a robot mounting plate 202 and a frame 204. The robot mounting plate 202 attaches to an arm of the BRR 102. The frame 204 is connected to the robot mounting plate 202 and to the linear actuator 130 and the bracket 134. The linear actuator 130 is connected to the bracket 132. The bracket 132 is connected to the camera 136 and the bolt runner 138. The bracket 134 is connected to the camera 140 and the bolt runner 142.

The linear actuator 130 includes a motor 220 and may include a screw inside a slide housing 222, which moves the bracket 132 towards or away from the bracket 134. This moves the camera 136 and the bolt runner 138 relative to the camera 140 and the bolt runner 142. This movement is represented by arrow h. Rotation of the BRR EE 104 about one of the X, Y, and Z axes is represented by 6. The bolt runners 138, 142 have respective sockets 230, 232, which are used to hold and drive bolts into a BIW.

Figure 3:
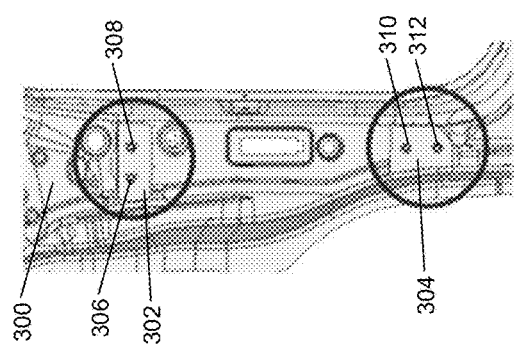
FIG. 3 is a side view of an example of a portion of a BIW pillar including two hinge mount locations with corresponding hinge bolt mounting holes.

FIG. 3 shows a portion 300 of a BIW pillar including two hinge mount locations 302, 304 with corresponding hinge bolt mounting holes 306, 308, 310, 312. The collaborative dual robot hinge mounting system disclosed herein may be used to mount hinges to the two hinge mount locations 302, 304.

Figure 4:
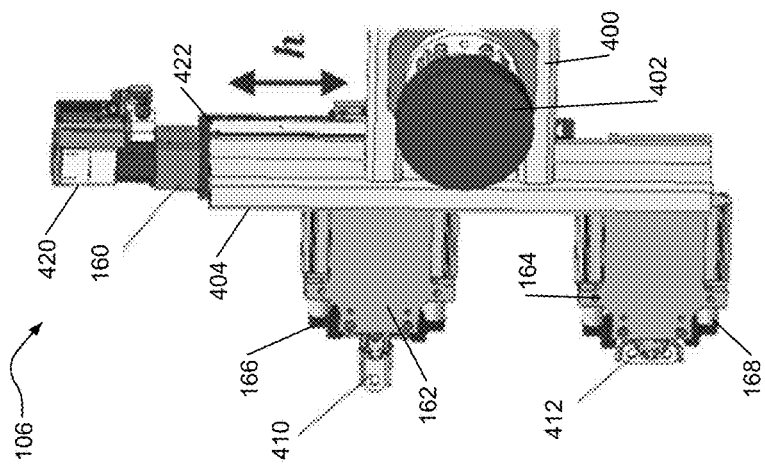
FIG. 4 is a side perspective view of an example hinge installation robot (HIR) end effector including a linear actuator and dual clamps in accordance with the present disclosure.

FIG. 4 shows the HIR end effector 108 that includes a robot arm attachment assembly 400, which includes a robot mounting plate 402 and a frame 404. The robot mounting plate 402 attaches to an arm of the HIR 106. The frame 404 is connected to the robot mounting plate 402 and to the linear actuator 160 and the bracket 162. The linear actuator 160 is connected to the bracket 162. The bracket 162 is connected to the clamp 166. The bracket 134 is connected to the clamp 166. The clamps 166, 168 clamp onto hinges 410, 412

The linear actuator 160 includes a motor 420 and may include a screw inside a slide housing 422, which moves the bracket 162 towards or away from the bracket 164. The movement of the bracket 162 moves the clamp 166 relative to the clamp 168. This movement is represented by arrow h.

Figure 5:
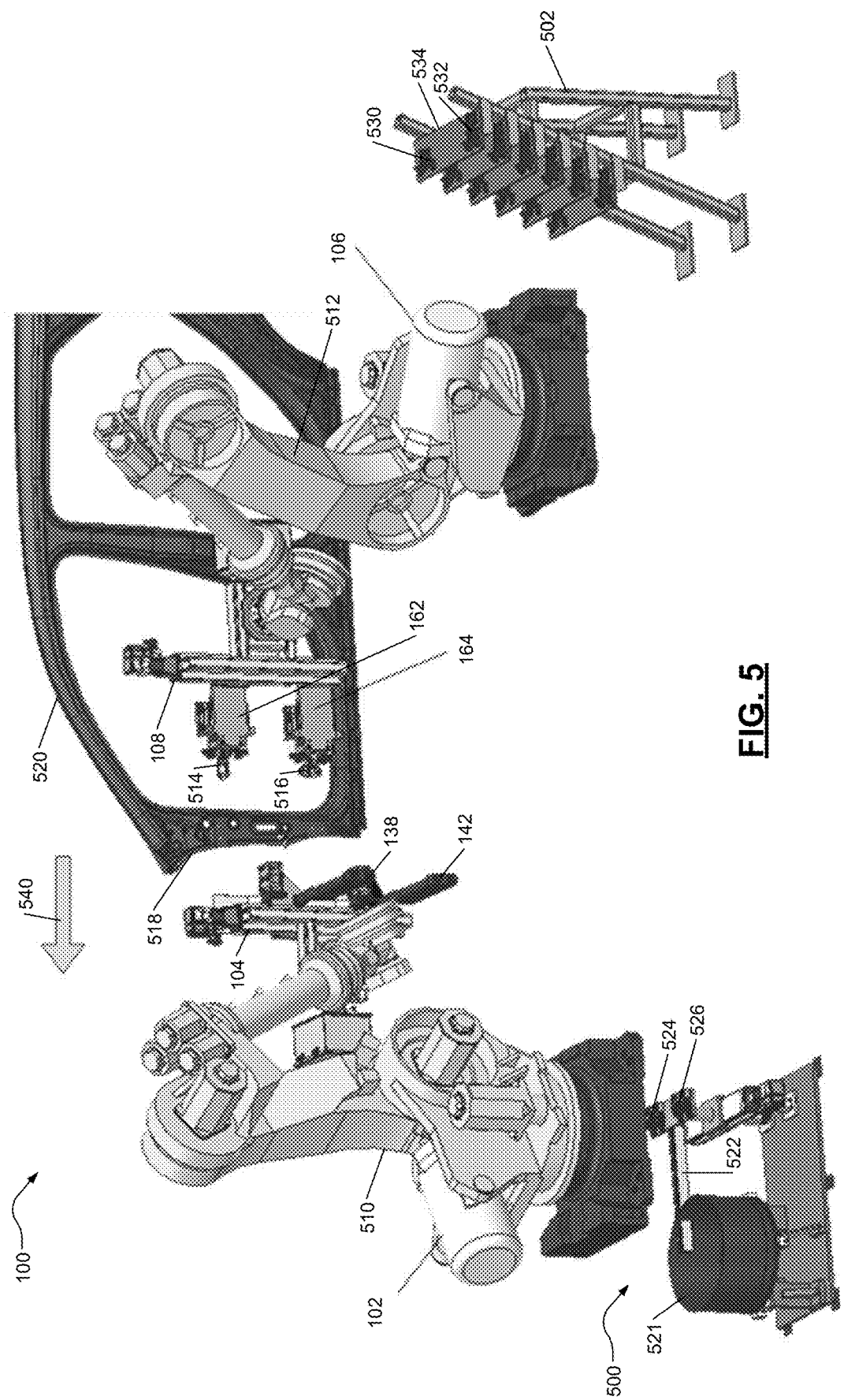
FIG. 5 is a perspective view of the collaborative dual robot hinge mounting system of FIG. 1 including dual robots and corresponding end effectors, a bolt feeding system, and a hinge rack in accordance with the present disclosure.

FIG. 5 shows the collaborative dual robot hinge mounting system 100 including the robots 102, 106 and corresponding end effectors 104, 108, a bolt feeding system 500, and a hinge rack 502. The robots 102, 106 have robot arms 510, 512 including respective arm members (or links) and motors. The BRR end effector 104 includes the bolt runners 138, 142. The HIR end effector 108 includes the brackets 162, 164. The robots 102, 106 mount hinges 514, 516 to a pillar 518 of a BIW 520. The bolt feeding system 500 may include a bolt container 521, a bolt transfer member 522, and bolt fixtures 524, 526. The BRR 102 moves the bolt runners 138, 142 to grab a pair of bolts from the bolt fixtures 524, 526 and then moves the bolts to drive the bolts through the hinges 514, 516 and into threaded holes in the pillar 518. The hinge rack 502 may include shelves for holding pairs of hinges. As an example, hinges 530, 532 may be disposed on a hinge separator 534. The HIR 106 moves the clamps 166, 168 shown in FIGS. 1 and 4 to grab a pair of hinges off the hinge rack 502 and then moves the pair of hinges near a pillar of a BIW to which the hinges are to be attached by the BRR. In an embodiment, the hinge rack 502 is replaced with an automated hinge rack system that loads and moves pairs of hinges to be grabbed by the clamps 166, 168. Arrow 540 indicates the direction of movement of the BIW 520.

Figure 6:
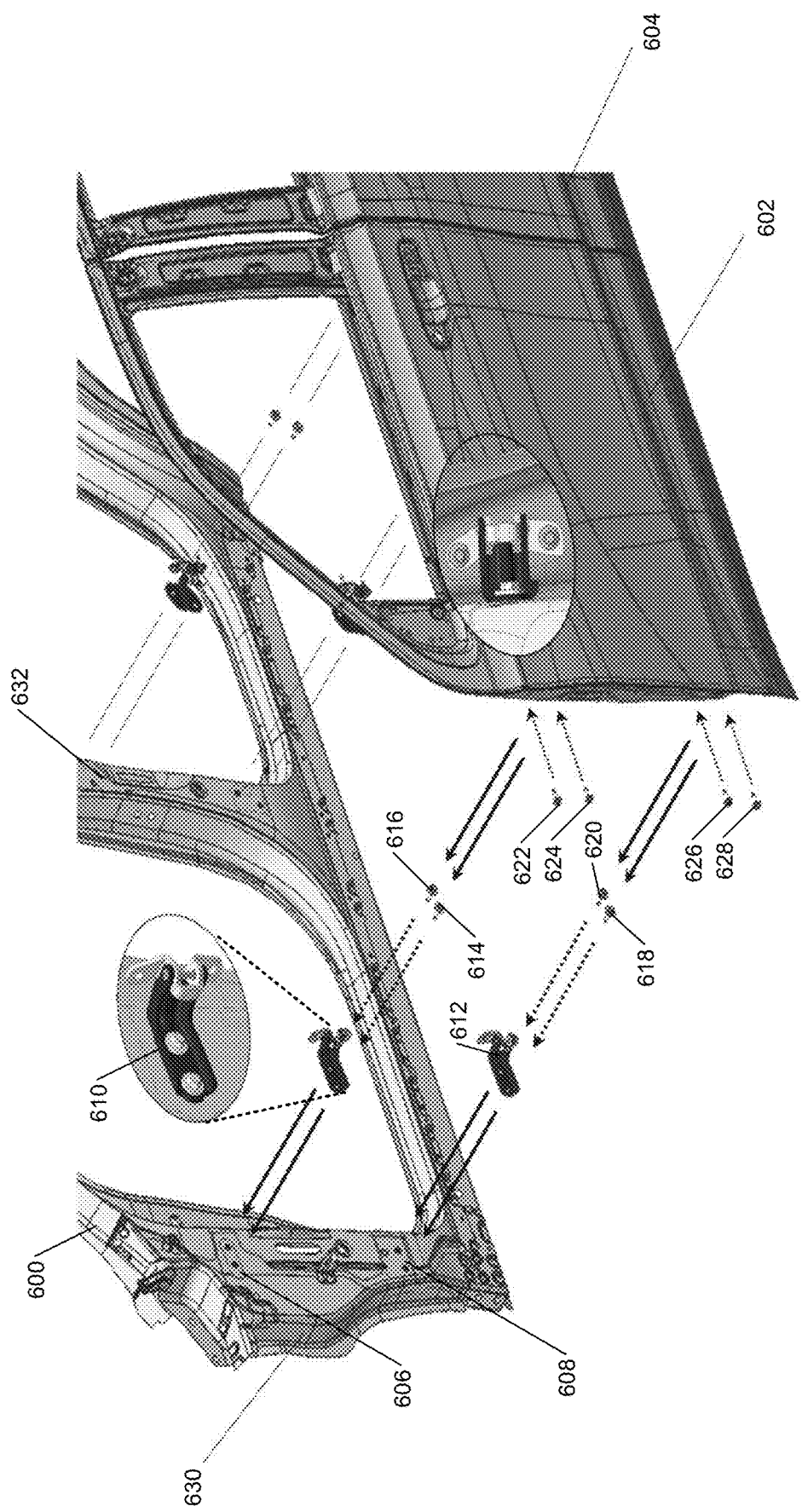
FIG. 6 is a perspective view of an example BIW and corresponding doors illustrating corresponding hinge mounting locations, hinges, and hinge mounting bolts.

FIG. 6 shows a BIW 600 and corresponding doors 602, 604 illustrating corresponding hinge mounting locations 606, 608 for the door 602, and hinges 610, 612. The hinges 610, 612 are attached to the hinge mounting locations 606, 608 via hinge mounting bolts 614, 616, 618, 620. The hinges 610, 612 are attached to the door 602 via bolts 622, 624, 626, 628. The BIW 600 includes an A-pillar 630 and a B-pillar 632. The hinges 610 and 612 may be attached to the BIW 600 using the systems disclosed herein.

Figure 7:
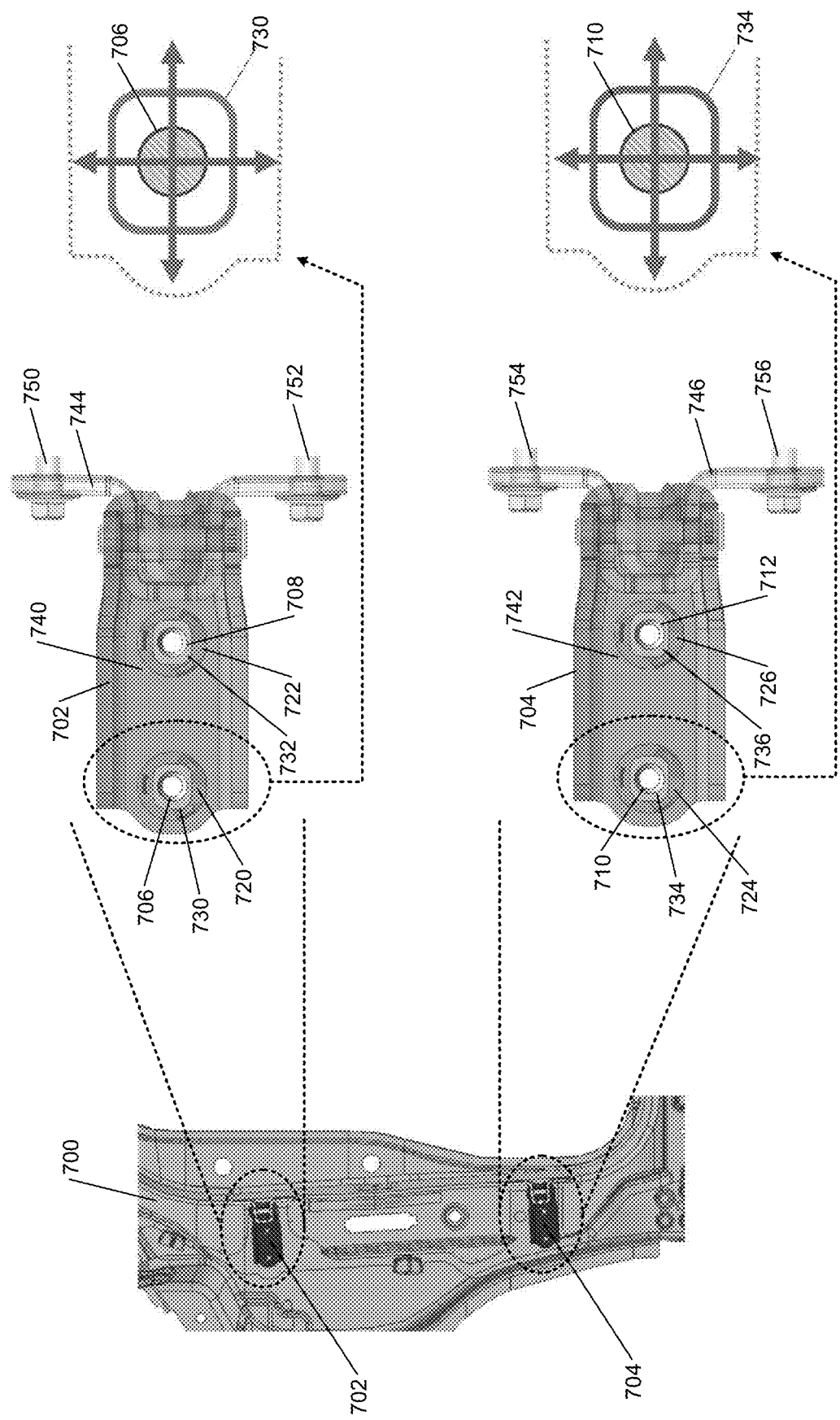
FIG. 7 is a side view of an example hinge mounting diagram including views of a pillar, corresponding upper and lower hinges, and mounting holes.

FIG. 7 shows a hinge mounting diagram including views of a pillar 700, corresponding upper and lower door hinges 702, 704, and threaded mounting holes 706, 708, 710, 712. The door hinges 702, 704 may include inserts 720, 722, 724, 726. The inserts 720, 722, 724, 726 may be positioned and centered over threaded inserts 730, 732, 734, 736 of the BIW 700 and/or the threaded holes 706, 708, 710, 712 of the BIW 700. Although the threaded inserts 730, 732, 734, 736 are shown in FIG. 7 as part of the hinges 702, 704, the threaded inserts 730, 732, 734, 736 are actually in the BIW 700. The hinges 702, 704 include brackets 740, 742 for attaching to the BIW 700 and brackets 744, 746 for attaching to a door via bolts 750, 752, 754, 756.

Figure 8:
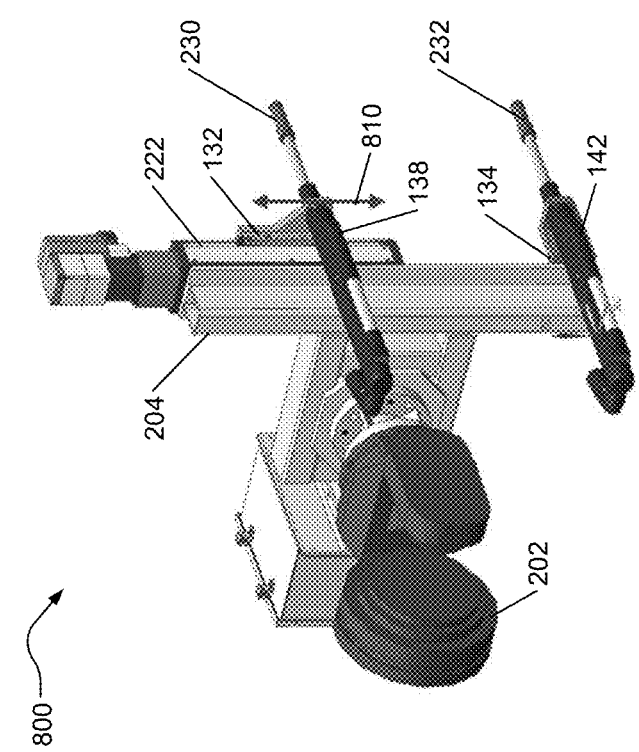
FIG. 8 is a perspective view of a portion of a BRR end effector of FIG. 2.

FIG. 8 shows a portion 800 of the BRR end effector 104 of FIG. 2. The portion 800 includes the robot mounting plate 202, the frame 204, the linear actuator 222, the brackets 132, 134, and the bolt runners 138, 142. The bolt runners 138, 142 drive sockets 230, 232 which drive bolts through holes in hinges and into threaded holes of a BIW. Movement of the bracket 132 and the bolt runner 138 relative to the bracket 134 and the bolt runner 142 is shown by arrow 810. In an embodiment, the bracket 134, the camera and the bolt runner 142 are fixed in position relative to the frame 204. Although the upper camera 136 and bolt runner 138 are shown as being able to be moved linearly relative to the frame 204, the upper camera 136 and bolt runner 138 may be fixed relative to the frame 204, and the lower camera 140 and bolt runner 142 may be moved linearly relative to the frame 204.

Figure 9:
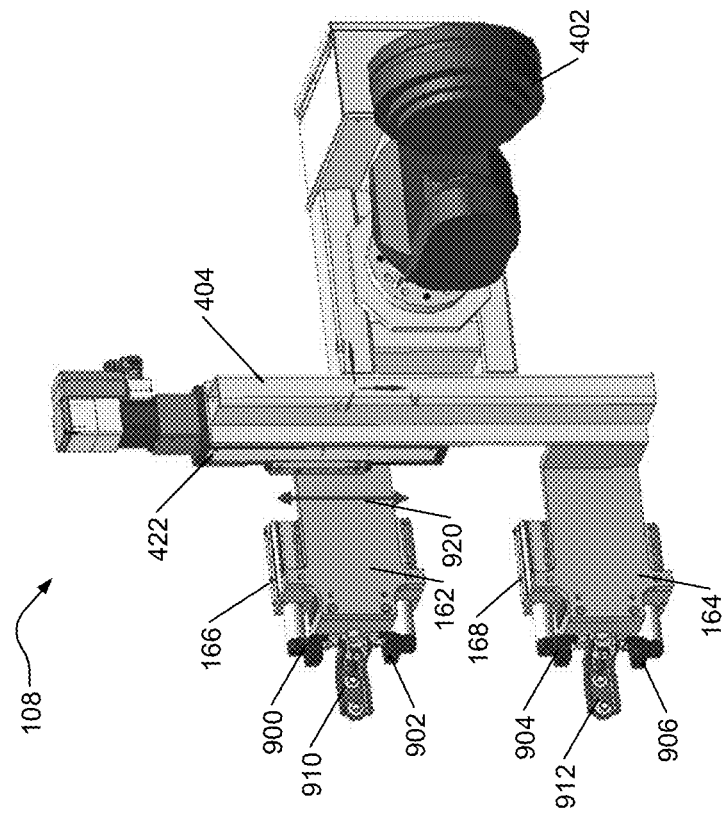
FIG. 9 is a perspective view of the HIR end effector of FIG. 4.

FIG. 9 shows the HIR end effector 108 of FIG. 4. The end effector 108 includes the pad 402, frame 404, linear actuator 422, brackets 162, 164, and clamps 166, 168. The clamps 166, 168 include grippers 900, 902, 904, 906 that clamp onto hinges 910, 912, which are to be mounted on a pillar of a BIW. Movement of the bracket 162 and clamp 166 relative to the bracket 164, and the clamp 168 is represented by arrow 920.

Figure 10:
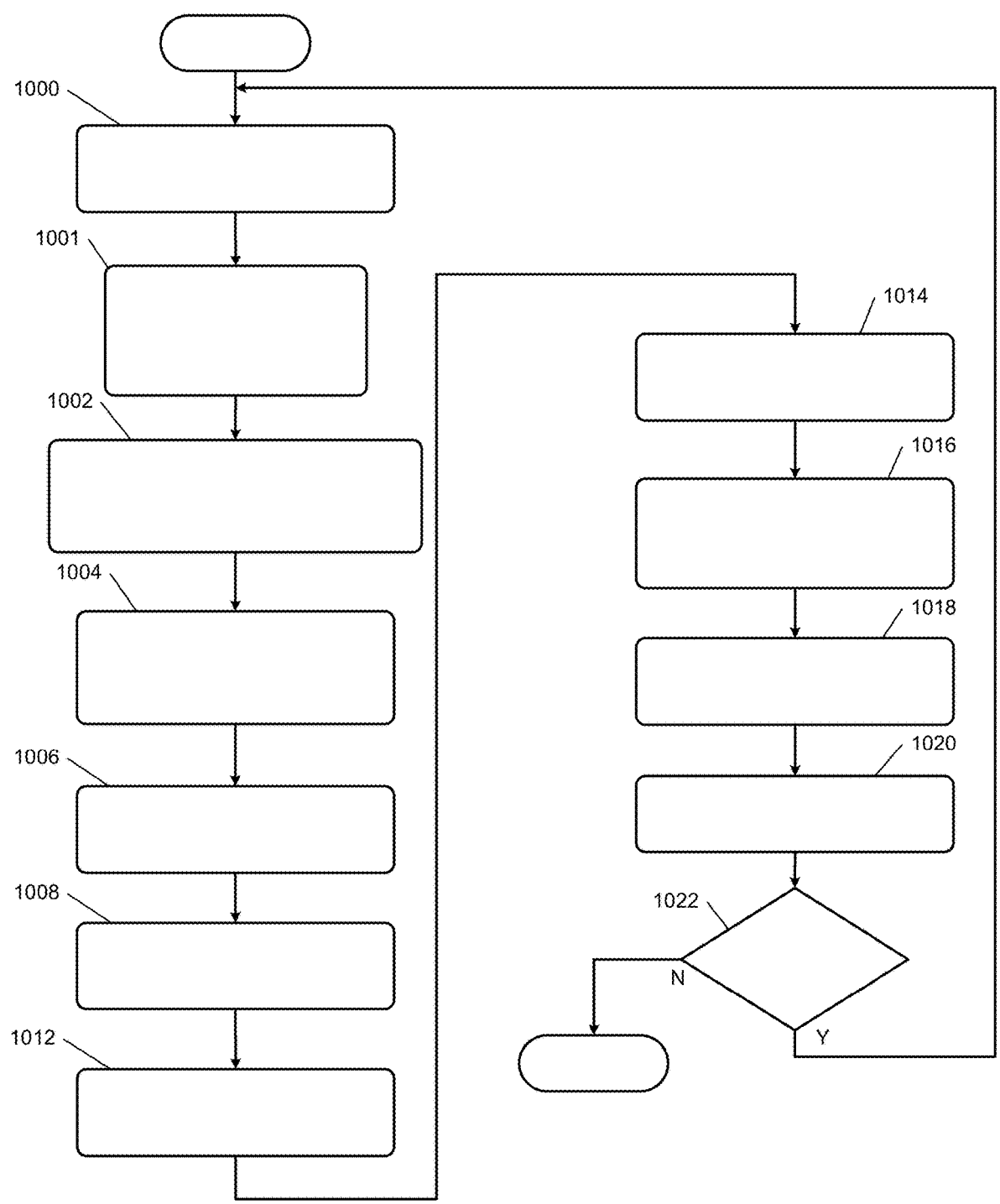
FIG. 10 illustrates a BRR operating method in accordance with the present disclosure.
Figure 11:
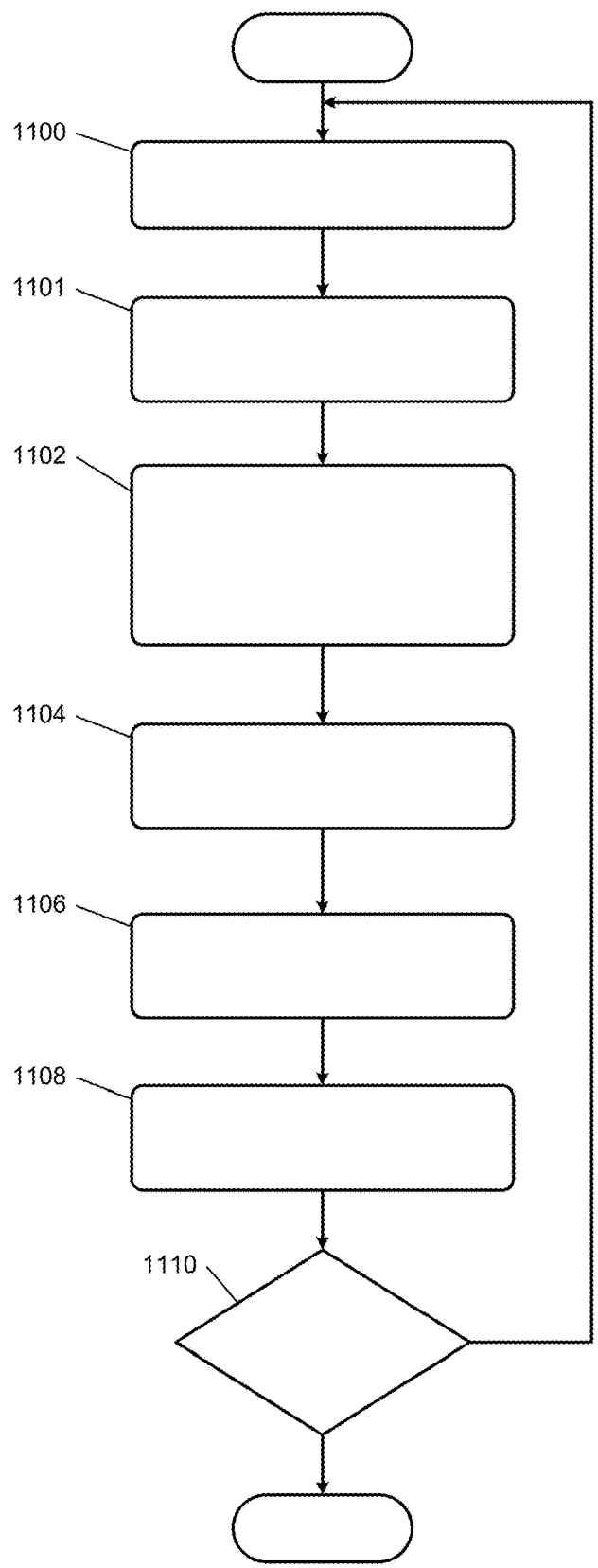
FIG. 11 illustrates a HIR operating method in accordance with the present disclosure.

The following methods of FIGS. 10-11 may be performed concurrently. The operations of FIGS. 10-11 may be iteratively performed. FIG. 10 shows a BRR operating method.

Prior to the operations of FIGS. 10-11 and prior to each iteration of FIGS. 10-11, a BIW may be moved to or along a hinge mounting station (or assembly cell), which include a collaborative dual robot hinge mounting system such as that disclosed herein. A first BIW may be moved into the hinge mounting station (or assembly cell), a current BIW may be moved after a pair of hinges are mounted on a first pillar to allow for another pair of hinges to be mounted on a second pillar, or a current BIW may be moved away from the hinge mounting station (or assembly cell) and another BIW of a same vehicle model or a different vehicle model may be moved into the hinge mounting station (or assembly cell). A hinge mounting station may refer to a location along an assembly line or an area within an assembly facility where hinges are mounted on pillars of BIWs.

At 1000, the BRR control module 120 controls the BRR 102 to move the BRR EE 104 to collect two mounting bolts as described above. At the end of this operation, each of the sockets 230, 232 of the bolt runners 138, 142 has a respective bolt to be driven through a respective one of the hinges and into the selected pillar.

At 1001, the BRR control module 120 of the BRR 102 adjusts a distance between the cameras 136, 140 for a selected pillar of a current model BIW based on a reference (or baseline) distance. The BRR control module 120 may look up, for example in a look-up table stored in the memory 121, a reference distance to start with for a particular pair of hinge locations for the selected pillar of the current model BIW. The camera 136 is moved relative to the camera 140 via the linear actuator 130 to provide the reference distance between the cameras 136, 140.

At 1002, the BRR control module 120 moves the cameras 136, 140 near the hinge mounting locations for the selected pillar of the current model BIW based on reference locations of the hinge mounting locations. The reference locations may be starting locations from which to position the cameras 136, 140 relative to the BIW.

At 1004, the BRR control module 120 adjusts positions and orientations of the cameras 136, 140 to positions at which to read the hinge mounting hole locations of the BIW and orientations of the hinge mounting hole locations of the BIW. This is done based on detected hole locations and orientations as detected by the cameras 136, 140. The positions and orientations of the cameras 136, 140 are adjusted based on detected locations and orientations of the hinge mounting holes in the BIW. The locations and orientations of the cameras may be adjusted until the sensors of the cameras 136, 140 are centered over and perpendicular to longitudinal center axes of the hinge mounting holes in the BIW. The longitudinal axes extend through the centers of the hinge mounting holes.

At 1006, the control modules 146, 150 via the cameras 136, 140 reads the locations and orientations (or angles) of the hinge mounting holes and analyzes the location and orientation data to determine the actual locations and orientations of the hinge mounting holes. The actual locations and orientations may be relative to a reference point and/or axis. As an example, the reference point may be located on the BRR 102 and/or BRR EE 104 or elsewhere.

At 1008, the control modules 146, 150 provide the actual locations and orientations to the HIR control module 122. This may include offset values indicating differences between the actual locations and orientations and reference locations and orientations. In an embodiment, operations 1004, 1006, 1008 are repeated for each of upper and lower hinge mounting holes of the pair of hinges being attached. In another embodiment, 1004, 1006, 1008 are performed once for all of the hinge mounting holes of the pair of hinges being attached. Operation 1100 of FIG. 11 may be performed subsequent to this operation.

At 1012, the BRR control module 120 may receive a signal indicating that the hinges are in the hinge mounting locations on the selected pillar and are ready to be fastened to the BIW. The signal may be received from the HIR control module 122 or elsewhere. As an alternative, the BRR control module 120 may detect via the cameras 136, 140 when the hinges are in the hinge mounting locations.

At 1014, the BRR control module 120 may move the mounting bolts in position to be run through the hinges and into the selected pillar of the current model BIW.

At 1016, the BRR control module 120 controls the bolt runners 138, 142 to drive the bolts through the hinges and into the hinge mounting holes in the BIW to fasten the hinges to the selected pillar in the hinge mounting locations. Operations 1010, 1014, 1016 may be repeated for each pair of upper and lower bolts run through the hinges into the BIW.

At 1018, the BRR control module 120 may verify the torque on the mounting bolts and adjust the torque to match predetermined torque settings. The BRR control module 120 may monitor, for example, amounts of current drawn by the bolt runners 138, 142 to turn the mounting bolts and convert the amounts of current to torque values. The BRR control module 120 may then adjust the amounts of torque on the mounting bolts based on the torque values.

At 1020, the BRR control module 120 may signal the HIR control module that the hinges are mounted.

At 1022, the BRR control module 120 may determine whether there is pair of hinges to be mounted. This may be on another pillar of the same BIW or and a different BIW. If yes, operation 1000 may be performed, otherwise the method may end. The different BIW may be of a same model vehicle or a different model vehicle.

FIG. 11 shows a HIR operating method. At 1100, the HIR control module 122 controls the positioning and operation of the clamps 166, 168 to grab a pair of hinges. Operation 1100 may be performed subsequent to operation 1008 of FIG. 10.

At 1101, the HIR control module 122 receives the hinge mounting hole locations and orientations, which may include the offset values, from the BRR control module 120.

At 1102, the HIR control module 122 moves the hinges via the HIR EE 108 and the clamps 166, 168 to the hinge mounting locations based on the received hinge mounting hole locations and orientations.

At 1104, the HIR control module 122 may signal the BRR control module 120 that the hinges are in the mounting locations. At 1106, the HIR control module 122 may receive a signal that the hinges are mounted. At 1108, the HIR control module 122 may then move the HIR EE 108 away from the BIW At 1110, the HIR control module 122 may determine whether there is another set of hinges to grab and position. If yes, operation 1100 may be performed, otherwise the method may end.

The above-described operations of FIGS. 10-11 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A collaborative dual robot hinge mounting system comprising:
a first robot comprising a first end effector and configured to move a pair of bolts via the first end effector in position to be run through a pair of hinges and into a body-in-white (BIW), wherein the first end effector comprises a first bolt runner and a second bolt runner;
a first camera and a second camera configured to detect at least one of locations and orientations of hinge mounting holes on the BIW for the pair of hinges; and
a control module configured to i) send to a second robot the at least one of the locations and the orientations of the hinge mounting holes to signal the second robot to position the pair of hinges relative to the BIW, and ii) in response to detecting the pair of hinges being placed relative to the BIW, drive the pair of bolts via the first bolt runner and the second bolt runner through the pair of hinges and into the hinge mounting holes in the BIW, wherein
the first camera and the second camera are mounted on the first end effector, and
the first end effector comprises a linear actuator configured to move the first camera relative to the second camera.

2. The collaborative dual robot hinge mounting system of claim 1, wherein the linear actuator is configured to move the first bolt runner relative to the second bolt runner.

3. The collaborative dual robot hinge mounting system of claim 1, wherein the linear actuator is configured to move the first camera and the first bolt runner relative to the second camera and the second bolt runner.

4. The collaborative dual robot hinge mounting system of claim 1, wherein:
the first camera and the second camera are configured to detect the locations and the orientations of the hinge mounting holes on the BIW for the pair of hinges; and
the control module is configured to send to the second robot the locations and the orientations of the hinge mounting holes.

5. The collaborative dual robot hinge mounting system of claim 1, wherein the control module is configured to receive a signal from the second robot indicating that the pair of hinges have been placed relative to the BIW and are ready to be attached to the BIW.

6. The collaborative dual robot hinge mounting system of claim 1, wherein the control module is configured to, via at least one of the first camera and the second camera, detect that the pair of hinges have been placed relative to the BIW and are ready to be attached to the BIW.

7. The collaborative dual robot hinge mounting system of claim 1, further comprising the second robot comprising a second end effector, wherein the second robot via the second end effector is configured to position the pair of hinges relative to the BIW in response to a signal received from the first robot indicating the locations of the pair of hinges.

8. The collaborative dual robot hinge mounting system of claim 1, wherein the control module is configured to verify torque applied by the first bolt runner and the second bolt runner respectively on the pair of bolts.

9. The collaborative dual robot hinge mounting system of claim 1, wherein the control module is configured i) via the first camera and the second camera, to detect centers of the hinge mounting holes and the orientations of the hinge mounting holes relative to at least one of the BIW and the first robot, and ii) subsequent to the second robot positioning the pair of hinges relative to the BIW, to position the first bolt runner and the second bolt runner relative to the pair of hinges based on the centers of the hinge mounting holes and the orientations of the hinge mounting holes.

10. A collaborative dual robot hinge mounting system comprising:
a first robot comprising a first end effector and configured to move a pair of bolts via the first end effector in position to be run through a pair of hinges and into a body-in-white (BIW), wherein the first end effector comprises a first bolt runner and a second bolt runner;

a first camera and a second camera configured to detect at least one of locations and orientations of hinge mounting holes on the BIW for the pair of hinges; and a control module configured to i) send to a second robot the at least one of the locations and the orientations of the hinge mounting holes to signal the second robot to position the pair of hinges relative to the BIW, and ii) in response to detecting the pair of hinges being placed relative to the BIW, drive the pair of bolts via the first bolt runner and the second bolt runner through the pair of hinges and into the hinge mounting holes in the BIW, wherein the first camera and the second camera are smart cameras configured to determine the locations and the orientations of the hinge mounting holes, offset values for the hinge mounting holes relative to reference values, and send the locations, the orientations and the offset values to the second robot.

11. A method of operating a collaborative dual robot hinge mounting system, the method comprising:

moving a pair of bolts via a first end effector of a first robot in position to be run through a pair of hinges and into a body-in-white (BIW), wherein the first end effector comprises a first bolt runner and a second bolt runner;

detecting via a first camera and a second camera at least one of locations and orientations of hinge mounting holes on the BIW for the pair of hinges;

sending to a second robot the at least one of the locations and the orientations of the hinge mounting holes to signal the second robot to position the pair of hinges relative to the BIW; in response to detecting the pair of hinges being placed relative to the BIW, driving the pair of bolts via the first bolt runner and the second bolt runner through the pair of hinges and into the hinge mounting holes in the BIW; and prior to driving the pair of bolts via the first bolt runner and the second bolt runner through the pair of hinges and into the hinge mounting holes, moving the first camera relative to the second camera.

12. The method of claim 11, further comprising, prior to driving the pair of bolts via the first bolt runner and the second bolt runner through the pair of hinges and into the hinge mounting holes, moving the first bolt runner relative to the second bolt runner.

13. The method of claim 11, further comprising:
detecting the locations and the orientations of the hinge mounting holes on the BIW for the pair of hinges; and
sending from the first robot to the second robot the locations and the orientations of the hinge mounting holes.

14. The method of claim 11, further comprising receiving a signal from the second robot indicating that the pair of hinges have been placed relative to the BIW and are ready to be attached to the BIW.

15. The method of claim 11, further comprising, via at least one of the first camera and the second camera, detecting that the pair of hinges have been placed relative to the BIW and are ready to be attached to the BIW.

16. The method of claim 11, further comprising positioning via the second robot the pair of hinges relative to the BIW in response to a signal received from the first robot indicating the locations of the pair of hinges.

17. The method of claim 11, further comprising verifying torque applied by the first bolt runner and the second bolt runner respectively on the pair of bolts.

18. The method of claim 11, further comprising i) via the first camera and the second camera, detecting centers of the hinge mounting holes and the orientations of the hinge mounting holes relative to at least one of the BIW and the first robot, and ii) subsequent to the second robot positioning the pair of hinges relative to the BIW, positioning the first bolt runner and the second bolt runner relative to the pair of hinges based on the centers of the hinge mounting holes and the orientations of the hinge mounting holes.

* * * * *